United States Patent [19]

Koike et al.

[11] 4,129,651

[45] Dec. 12, 1978

[54] METHOD OF REMOVING NITROGEN OXIDES IN EXHAUST COMBUSTION GASES

[75] Inventors: Sakae Koike; Shoichi Matsunami; Yasuo Fujiwara, all of Kurashiki, Japan

[73] Assignee: Mitsubishi Chemical Industries, Ltd., Tokyo, Japan

[21] Appl. No.: 739,729

[22] Filed: Nov. 8, 1976

Related U.S. Application Data

[63] Continuation-in-part of Ser. No. 648,730, Jan. 13, 1976, abandoned.

[30] Foreign Application Priority Data

Jan. 13, 1975 [JP] Japan .................................. 50-6174
Jan. 16, 1975 [JP] Japan .................................. 50-7312

[51] Int. Cl.$^2$ ............................................. C01B 21/00
[52] U.S. Cl. ...................................................... 423/235
[58] Field of Search ........................... 423/235, 23, 351

[56] References Cited

U.S. PATENT DOCUMENTS

3,846,981  11/1974  Paczkowski .......................... 423/235
3,900,554  8/1975  Lyon ..................................... 423/235

*Primary Examiner*—G. O. Peters
*Assistant Examiner*—E. T. Wheelock
*Attorney, Agent, or Firm*—Oblon, Fisher, Spivak, McClelland & Maier

[57] ABSTRACT

In a method of removing nitrogen oxides non-catalytically from an exhaust combustion gas by maintaining said combustion gas at a temperature of from 700° to 1300° C in the presence of oxygen and an ammonia source in a combustion apparatus which has heat exchange surfaces in a zone downstream of the position where the ammonia source is added, the improvement which comprises feeding said ammonia source to the exhaust combustion gas at a position where the heat exchange surface area in the space downstream of the position of ammonia source addition which has a combustion gas residence time of up to 1 second is less than $0.5 \times 10^{-2}$ m$^2$ per 1 Nm$^3$/H of said combustion gas flow; and the temperature of said combustion gas at the outlet of said space is above 700° C.

2 Claims, No Drawings

METHOD OF REMOVING NITROGEN OXIDES IN EXHAUST COMBUSTION GASES

CROSS REFERENCE TO RELATED APPLICATIONS

This application is a continuation-in-part of application Ser. No. 648,730, filed Jan. 13, 1976, now abandoned.

BACKGROUND OF THE INVENTION

1. Field of the Invention

The present invention relates to a method of removing nitrogen oxides from combustion exhaust gases. More particularly, it relates to a highly efficient method of removing nitrogen oxides from combustion exhaust gases formed in industrial combustion apparatus.

2. Description of the Prior Art

The nitrogen oxides NO and $NO_2$ (hereinafter referring to as $NO_x$) are toxic to the human body. These oxides are absorbed by the human body and body functions deteriorate as a result. $NO_x$ also causes photochemical smog. Accordingly, it is important to develop a method for removing $NO_x$ from gases discharged into the atmosphere. Of particular importance is the removal of $NO_x$ from the combustion exhaust discharged from steam generating boilers for electric power plants which are a major source of nitrogen oxides.

Various methods for removing $NO_x$ from combustion exhaust gases have been proposed. For example, it has been known to remove $NO_x$ by the catalytic reduction of the $NO_x$ containing combustion exhaust gas at about 200°–500° C. with ammonia in the presence of various metal oxides supported on a carrier as the catalyst. When the concentration of oxygen is relatively high, it is possible to selectively react the $NO_x$ with ammonia. However, in this method it is necessary to use an expensive catalyst which is poisoned by the various impurities such as sulfur oxide, steam, soot and the like in the exhaust combustion gas to lower the catalytic activity.

Accordingly, it is necessary to treat the catalyst to reactivate and recover it. It is necessary to use expensive apparatus to perform the process. Further, operating costs are high because of the necessity for compensating for the pressure loss at the catalyst layer and adjusting the temperature of gas to be the optimum temperature for the reaction. The temperature is different depending upon type of the catalyst, and the range of the applicable temperature is narrow. For example, the active temperature in the case of a platinum catalyst is 210°–350° C.

It has also been proposed in U.S. Pat. No. 3,900,554 to remove $NO_x$ from the $NO_x$ containing exhaust combustion gas by maintaining said gas at 700°–1300° C. in the presence of oxygen and ammonia or an ammonia precursor without using a metal oxide catalyst. The $NO_x$ is reduced to nitrogen and the process has significant industrial advantages. The inventors have conducted experiments to apply this method to various combustion apparatus, and have found the following facts:

In industrial combustion apparatus such as a boiler for electric power generation and other power plants, it is usual to dispose a high density of heat exchange pipes made of stainless steel in the high temperature zone of the exhaust combustion gas stream in order to attain a high heat efficiency. When the ammonia source is fed to the zone having a high density of metallic heat exchange surfaces, the ammonia is decomposed and converted by the catalytic action of the metallic surface to form $NO_x$. Accordingly, in industrial combustion apparatus, it is important to select a position for feeding the ammonia to limit the density (heat transfer area) of the metallic heat exchange surfaces downstream thereof. Moreover, when a fuel such as heavy oil containing a vanadium component has been used in the combustion apparatus such as a boiler, a semi-molten scale containing the vanadium component adheres on the heat exchange surfaces. Typically, the heat exchange surface is disposed in a zone having a temperature of about 700° C. whereby the vanadium scale causes the decomposition of the ammonia which is fed in at a temperature higher than 700° C. so as to cause $NO_x$ formation. Accordingly, when a heat exchange surface covered with a scale containing a vanadium component is disposed downstream near the position for feeding ammonia, it is desirable to limit the heat transfer area of the heat exchange surface.

There is, then, a need for a technique which would allow for the addition of ammonia to exhaust gases without the occurrence of ammonia decomposition on the heat exchange surfaces.

SUMMARY OF THE INVENTION

Accordingly, it is an object of this invention to provide a method of removing nitrogen oxides in an exhaust combustion gas without the above-mentioned disadvantages of the formation of $NO_x$ by the decomposition of ammonia.

This and other objects of this invention have been attained by providing a method of removing nitrogen oxides in an exhaust combustion gas which comprises maintaining said combustion gas at a temperature of from 700°–1300° C. in the presence of oxygen and a source of ammonia or an ammonia precursor in a combustion apparatus having metallic heat exchange surfaces disposed in a zone downstream of the exhaust combustion gas which has a temperature higher than 700° C. The ammonia source is fed to the exhaust combustion gas at a position wherein the heat transfer area of the heat exchange surfaces in the space where the residence time of said combustion gas downstream of the ammonia feed position is up to 1 second is less than $0.5 \times 10^{-2}$ $m^2$ per 1 $Nm^3/H$ of said combustion gas flow. The temperature of said combustion gas at the outlet of said space is higher than 700° C. When the heat exchange surfaces of the combustion apparatus are covered with vanadium-containing scale, the heat transfer area of the heat exchange surfaces in the space where the residence time of said combustion gas downstream of the ammonia feed position is up to 1 second is less than $0.4 \times 10^{-2}$ $m^2$ per 1 $Nm^3/H$ of said combustion gas flow.

DETAILED DESCRIPTION OF THE PREFERRED EMBODIMENTS

The method of the invention is to indirectly define a rate of decomposition of a part of ammonia by contacting ammonia with a surface of the heat exchanger pipes under defining the surface area of the heat exchanger pipes being present in the zone maintaining the temperature of the exhaust combustion gas in a range of 1300° to 700° C., in the method of non-catalytically removing nitrogen oxides in the exhaust combustion gas by introducing ammonia.

The invention is to attain high nitrogen oxide removal rate under maintaining enough amount of ammonia introduced in the zone which is contributed for removing nitrogen oxide without contacting with the surface of the heat exchanger pipes.

The inventors have found that the following practical problem is found when the nitrogen oxide removing process of U.S. Pat. No. 3,900,554 is applied for an industrial combustion apparatus.

Although a part of ammonia injected into the exhaust combustion gas in the zone at 1300° to 700° C., is diffused into the exhaust combustion gas to contribute for removing nitrogen oxides, the other part of ammonia is contacted with the surface of the heat exchanger pipes whereby ammonia is converted to nitrogen oxides under the catalytic activity of the metal surface or vanadium adhered on the metal surface and the amount of nitrogen oxides is increased on the contrary of the contribution for removing nitrogen oxides.

Accordingly, even though ammonia required for imparting desired effect for removing nitrogen oxides, is injected, the amount of ammonia converting to nitrogen oxide is large whereby it is difficult to attain the desired result. The nitrogen oxide removing process can not be attained with an industrial advantages.

Accordingly, the inventors have found that the allowable limit for converting ammonia to nitrogen oxide and the condition for maintaining it below the allowable limitation when the process of U.S. Pat. No. 3,900,554 is applied for the industrial combustion apparatus. The problem has been dissolved by the consideration.

Incidentally, the method of the invention is applied for an industrial apparatus especially for a boiler such as a steam boiler which has a sectional area of 1 to 5,000 m² in which heat exchange pipes are disposed.

The combustion apparatus used in the method of this invention comprises a plurality of heat exchange pipes in which a heat transfer material is passing through for generating super-heated steam, or heated liquid etc. in a high temperature zone having a temperature higher than 700° C. The heat exchange surface may be fabricated from various metals, typically, steels. The combustion apparatus is an industrial combustion apparatus such as an industrial boiler for electric power generation or other power. It is especially important to apply the method of this invention to combustion apparatus which have many heat exchange pipes for the generation of super-heated steam etc. in a higher temperature zone having a temperature higher than 700° C., particularly where the heat exchange surface (heat transfer surface) is covered with a scale containing a vanadium component as the result of use of a fuel containing a vanadium component in the past or presently. Industrial boilers for electric power generation or other power by the combustion of heavy oils has scale containing such a vanadium component. The vanadium component may be in a form of a combination of vanadium atoms bonded with oxygen atoms. The vanadium component is formed by the combustion of a fuel containing a vanadium component. The scale containing the vanadium component exhibits catalytic activity to convert ammonia to $NO_x$. Accordingly, it is quite important to apply the method of this invention to combustion apparatus having vanadium-containing scale on the heat exchange surfaces.

The basic concept of this invention is to provide a unique dry method of removing $NO_x$ from an exhaust combustion gas by adding an ammonia source to said combustion gas without using a catalyst in the combustion apparatus. This concept is achieved by feeding the ammonia source to the combustion apparatus at a specific position.

In the method of this invention, it is indispensable that oxygen be present in the exhaust combustion gas together with the ammonia source. The exhaust combustion gas usually contains the desired amount of oxygen. When the oxygen content is too small, it is preferably to dilute said combustion gas with air to give an oxygen content of higher than 0.1 vol. %, preferably 2-15 vol. %.

The amount of ammonia source added can be selected from the viewpoint of economical operation and $NO_x$ removal rate. It is preferably in the range of about 0.6-50 times, especially 1-20 times the $NO_x$ concentration in the total gas. When an excess of ammonia is added, the unreacted ammonia in the exhaust combustion gas may be removed by washing with a mineral acid or treating by other conventional decomposing methods, if desired. On the other hand, it is possible to remove a part of the $NO_x$ by feedng too little of the ammonia source and removing the remaining $NO_x$ by another treatment method.

In the method of this invention, the $NO_x$ containing exhaust combustion gas is maintained at 700°-1300° C., preferably 800°-1100° C., in the presence of oxygen and the ammonia source. In general, when an excess of ammonia is added, the reduction of $NO_x$ can be easily conducted even at relatively low temperatures. However, it is difficult to effectively remove $NO_x$ at temperatures lower than 700° C. The oxidation of ammonia occurs at temperatures above 1300° C., also it is undesirable to operate at temperatures higher than 1300° C. from the viewpoint of heat economy.

The length of time the combustion gas is maintained at said temperature is dependent upon the degree of distribution of the ammonia source in the combustion gas. When ammonia is uniformly mixed, the time may be on the order of 0.01 seconds, possibly even less. However, it is preferable to maintain the gas at this temperature for about 1 second from the position of feeding the ammonia source, because there is a minimum diffusion time required for effective ammonia mixing. That is, this temperature is maintained in the space it takes the combustion gases to travel in about 1 second. This is important to attain high heat efficiency in the boiler.

Accordingly, it is usual to dispose many heat exchange pipes in a small space even within said temperature zone. The metallic heat exchange surfaces which have a broad surface area are present downstream of the position for feeding the ammonia source, whereby the temperature of the exhaust combustion gas is rapidly decreased below the effective reaction temperature before attaining satisfactory reduction of $NO_x$, the ammonia source added is decomposed and a part of ammonia is oxidized to $NO_x$ so as to increase $NO_x$ content in the exhaust combustion gas. Accordingly, it is quite important to select the position for feeding the ammonia source wherein the heat transfer area of the heat exchange surfaces in the space where the residence time of said combustion gas is up to 1 second downstream of the ammonia source feed position is less than $0.5 \times 10^{-2}$ m² per 1 Nm³/H of said combustion gas flow. When the heat exchange surface is covered with a vanadium containing scale, the heat transfer area of the heat exchange surfaces in the space where the residence time of said combustion gas is up to 1 second downstream of the ammonia source feed position is less than $0.4 \times 10^{-2}$ $m^2$ per 1 $Nm^3/H$ of said combustion gas flow. As a lower limit, the heat exchange area in the space where the residence time of the waste gas is up to 1 second downstream of the ammonia source is at least $0.1 \times 10^{-5}$ $m^2$ per 1 $Nm^3/H$ of the combustion gas flow.

This concept can be expressed, alternatively, as limiting the heat exchange area in that space it takes the combustion gases to travel in up to 1 second. The heat exchange area in this space is less than $0.5 \times 10^{-2}$ $m^2$ per 1 $Nm^3/H$ of combustion gas flow but when vanadium containing scale is present the heat exchange area in this space is less than $0.4 \times 10^{-}$ $m^2$ per 1 $Nm^3/H$ of combustion gas. Preferably, the heat exchange area is limited to above values in the space it takes the combustion gases to flow in from about 0.01 seconds to about 1 second, more preferably the space it takes the combustion gases to flow in the order of about 1 second.

Higher $NO_x$ removal rates can be attained by decreasing the heat transfer area. However, smaller heat transfer areas for the heat exchange surface is not desirable from the viewpoint of the heat efficiency of the boiler per unit of volume. Accordingly, the optimum heat transfer area is selected from the viewpoint of balancing the various factors. In general, it is preferable that the heat exchange area be less than $0.4 \times 10^{-2}$ $m^2$, especially from $0.2$–$0.3 \times 10^{-2}$ $m^2$. Typically, the heat exchange pipe is usually made of a steel such as carbon steels, alloy steels, stainless steels and the like. In the method of this invention, it is usual to dispose the heat exchange pipes having the heat transfer surface made of said steel directly in contact with said combustion gas. The heat exchange surface can be covered with a scale containing a vanadium component.

The position at which the ammonia source is added should be one to which the flame does not reach. It is not desirable to contact the ammonia source with the flame because ammonia is decomposed and converted to $NO_x$ when contacted by the flame. The reduction of $NO_x$ can be achieved at temperatures above 700° C., as stated above. When the temperature at the position for feeding the ammonia source is near 700° C., there is the possibility of not effecting a sufficient reduction of $NO_x$. Accordingly, it is preferred to select the position for feeding the ammonia source at the zone wherein the temperature is 750°–1300° C., 800°–1100° C. If it is possible to locate a position for feeding the ammonia source having the above conditions in an already existing boiler, such a boiler may be used in the method of this invention. However, a new boiler having a structure so that the above conditions are met can be newly designed. The present invention has sufficient economic value so as to justify a new boiler.

In feeding the ammonia source, such as ammonia or an ammonia precursor e.g. ammonium carbonate, it is preferable to distribute the ammonia source as uniformly as far as possible in said combustion gas by a conventional manner and device. The ammonia source can be diluted with a gas which does not inhibit the reduction of $NO_x$ if desired. When the position for feeding the ammonia source is at relatively high temperature in said range, it is preferable to use a jacketed pipe for feeding the ammonia source. The pipe is cooled by passing a coolant in the jacket, in this manner superior results can be attained.

The mechanism for removing $NO_x$ by the method of this invention is not clearly understood. It is clear that to reduce $NO_x$ to nitrogen in the presence of oxygen and ammonia a high temperature zone is indispensable. Accordingly, it is quite different from the conventional method of removing $NO_x$ in the presence of a metal-type catalyst at the relatively low temperature of about 200°–500° C.

The industrial advantages of the method of the invention are great. For example, the cost of the method of this invention is less than 1/10 that of the most economical conventional method currently known. The invention provides a unique technology for removing $NO_x$ in an industrial combustion apparatus which discharges a large volume of exhaust combustion gas, such as a boiler. In the method of this invention, it is possible to dispose an interceptor for preventing the contact of the flame with the ammonia feed pipe. The nozzles of the ammonia feed pipes can be disposed downstream of the combustion chamber so as to uniformly distribute the ammonia source in the exhaust combustion gas. The space velocity of the exhaust combustion gas is less than 200,000 vol/vol/hr. preferably less than 50,000 vol/vol/hr.

It is also preferable to use a furnace made of nonmetallic refractory materials such as silicate, agalmatolite and chamotte, silica refractory material.

Having generally described this invention, a further understanding can be obtained by reference to certain specific examples which are provided herein for purposes of illustration only and are not intended to be limiting unless otherwise specified.

EXAMPLES 1–6 and REFERENCES 1–3

In a combustion furnace for the combustion of a hydrocarbon-type fuel oil, a duct having a sectional area of 0.3 m × 0.3 m was formed downstream of the combustion chamber, and an exhaust combustion gas having 190 vol. ppm of an average $NO_x$ content was fed at a rate of 70 $Nm^3/H$. An ammonia feed pipe having nozzles and a jacket for cooling the outer surface of the pipe with a coolant gas was disposed near the inlet of the duct, at the position where the temperature is 1050° C. but to which the flame does not reach. A mixed gas of ammonia diluted with nitrogen was injected from the nozzles into the exhaust combustion gas at the specific rate set forth in Table 1. In the space from the position of the ammonia feed nozzles to the downstream position of less than 1 second of a residence time of the exhaust combustion gas, the desired number of heat exchange pipes having a stainless steel surface were uniformly disposed so as to give the specific heat transfer area as set forth in Table 1. The temperature and flow rate of steam passed through each inner part of said heat exchange pipe were controlled so as to obtain the specific temperature of the exhaust combustion gas at the outlet of said space. This temperature is reported in Table 1. The material of the heat exchange pipes and the feed rate of ammonia and the heat transfer area ratio to unit of flow rate of the exhaust combustion gas were varied as reported in Table 1. The $NO_x$ content of the exhaust combustion gas at the outlet of the duct was measured by a chemiluminescent analysis. The results are shown in Table 1.

Table 1

| Test | Exp. 1 | Exp. 2 | Exp. 3 | Exp. 4 | Exp. 5 | Exp. 6 |
|---|---|---|---|---|---|---|
| Heat exchange | stainless | stainless | stainless | alloy | carbon | — |

Table 1-continued

| pipe material | steel pipe SUS321HTB | steel pipe SUS321HTB | steel pipe SUS321HTB | steel pipe STBA-24 | steel pipe STB-42 | |
|---|---|---|---|---|---|---|
| Heat transfer area ratio ($m^2/Nm^3/H$) | $0.3 \times 10^{-2}$ | $0.5 \times 10^{-2}$ | $0.5 \times 10^{-2}$ | $0.5 \times 10^{-2}$ | $0.5 \times 10^{-2}$ | — |
| $NH_3$ feed rate (Nl/H) | 50 | 50 | 25 | 50 | 50 | 50 |
| Temperature at outlet of specific space (° C) | 700 | 700 | 700 | 700 | 700 | *(700) |
| $NO_x$ content at outlet of duct (vol. ppm) | 29 | 46 | 103 | 51 | 48 | 10 |
| $NO_x$ removal rate (%) | 85 | 76 | 46 | 73 | 75 | 95 |

NOTE*
STB-42: JISG 3461 Carbon Steel Boiler and Heat Exchanger Tubes
STBA-24: JISG 3462 Alloy Steel Boiler and Heat Exchanger Tubes
SUS 321 HTB: JISG 3463 Stainless Steel Boiler and Heat Exchanger Tubes

| Test | Ref. 1 | Ref. 2 | Ref. 3 |
|---|---|---|---|
| Heat Exchange pipe material | SUS321HTB | SUS321HTB | STBA-24 |
| Heat transfer area ratio ($m^2/Nm^3/H$) | 0.5 | 1.0 | 1.0 |
| $NH_3$ feed rate (Nl/H) | 50 | 50 | 50 |
| Temperature at outlet of specific space (° C) | 600 | 400 | 400 |
| $NO_x$ content at outlet of duct (vol. ppm) | 139 | 150 | 152 |
| $NO_x$ removal rate (%) | 27 | 21 | 20 |

*In Example 6, no heat exchange pipe was disposed in the space from the position of ammonia feed nozzles to the downstream position of less than 1 second of residence time of the exhaust combustion gas, the heat exchange pipes were disposed downstream of this space and the temperature of the exhaust combustion gas at the outlet of the duct was 700° C.

EXAMPLES 7-10 and REFERENCES 4-6:

In accordance with the method of Example 1, the same tests were conducted except using heat exchange pipes whose outer surfaces were covered with a scale containing more than 30 wt. % of vanadium oxides and other metal compounds e.g. compounds of iron, nickel, sodium, etc., which result from long operation using combustion fuels containing vanadium components. The conditions and the results of the tests are shown in Table 2.

Table 2

| Test | Exp. 7 | Exp. 8 | Exp. 9 | 10 |
|---|---|---|---|---|
| Heat transfer area ratio $10^{-2}$ | $0.40 \times 10^{-2}$ | $0.40 \times$ | $0.20 \times$ | 0 |
| $NH_3$ feed rate (Nl/H) | 50 | 25 | 50 | 50 |
| $NO_x$ content at outlet of duct (vol. ppm) | 55 | 108 | 34 | 10 |
| $NO_x$ removal rate (%) | 71 | 43 | 82 | 95 |

| Test | Ref. 4 | Ref. 5 | Ref. 6 |
|---|---|---|---|
| Heat transfer area ratio ($m^2/Nm^3/H$) | $0.80 \times 10^{-2}$ | $0.80 \times 10^{-2}$ | $0.20 \cdot 10^{-2}$ |
| $NH_3$ feed rate (Nl/H) | 50 | 25 | 0 |
| $NO_x$ content at outlet of duct (vol. ppm) | 169 | 180 | 190 |
| $NO_x$ removal rate (%) | 1.1 | 5 | 0 |

In Example 10, no heat exchange pipe was disposed in the space from the position of ammonia feed nozzles to the downstream position of less than 1 second of residence time of the exhaust combustion gas and the heat exchange pipes were disposed downstream of said space and the temperature of the exhaust combustion gas at the outlet of the duct was 700° C.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a method of removing nitrogen oxides noncatalytically from an exhaust combustion gas by maintaining said combustion gas at a temperature of from 700°-1300° C. in the presence of 0.1-15 Vol.% of oxygen in said combustion gas and an ammonia source in a combustion apparatus which has metallic heat exchange pipes in a zone downstream of the position where the ammonia source is added, the improvement which comprises:

feeding said ammonia source in an amount of 0.6-50 times the $NO_x$ concentration in said combustion gas into said exhaust combustion gas at a position where the total surface area of the heat exchange pipes, in the space downstream of the position of ammonia source addition which has a combustion gas residence time of about 1 second, is the range of $0.1 \times 10^{-5} - 0.5 \times 10^{-2}$ m$^2$ per 1 Nm$^3$/H of said combustion gas flow; and the temperature of said combustion gas at the outlet of said space is above 700° C.

2. The method of removing nitrogen oxides of claim 1, wherein the heat exchange surface is covered with a scale containing vanadium component and said heat transfer area in said space is less than $0.4 \times 10^{-2}$ m$^2$ per 1 Nm$^3$/H of said combustion gas flow.

* * * * *